United States Patent [19]
Mistretta et al.

[11] Patent Number: 5,180,593
[45] Date of Patent: Jan. 19, 1993

[54] SHEETER MACHINE

[75] Inventors: Joseph L. Mistretta, Riverside; Jesus E. Reyes, Whittier, both of Calif.

[73] Assignee: Meyer Tempco, Inc., San Antonio, Tex.

[21] Appl. No.: 656,251

[22] Filed: Feb. 14, 1991

[51] Int. Cl.⁵ .................. A21C 3/02; A21C 11/04; B29C 43/46; B29C 43/50
[52] U.S. Cl. .................. 425/202; 425/229; 425/310; 425/363
[58] Field of Search .......... 425/230, 229, 363, 308, 425/310, 202

[56] References Cited

U.S. PATENT DOCUMENTS

| | | | |
|---|---|---|---|
| 324,529 | 8/1885 | Bromley et al. | 425/363 |
| 1,430,265 | 9/1922 | Sexauer | 425/230 |
| 2,055,205 | 9/1936 | Pereyra | 425/185 |
| 2,071,035 | 2/1937 | Jenett | 118/245 |
| 2,488,189 | 11/1949 | Hanson | 425/203 |
| 2,537,395 | 1/1951 | Brown | 425/208 |
| 2,586,607 | 2/1952 | Brown | 264/349 |
| 2,596,277 | 5/1952 | Naylor | 425/363 |
| 2,608,939 | 9/1952 | Naylor | 425/363 |
| 2,615,404 | 10/1952 | Crosland et al. | 425/363 |
| 2,666,399 | 1/1954 | Pereyra | 425/363 |
| 2,693,154 | 11/1954 | Appleton | 425/367 |
| 2,788,752 | 4/1957 | Rhodes | 425/363 |
| 3,429,282 | 2/1969 | Ruiz | 425/230 |
| 3,561,359 | 2/1971 | Cohen | 100/168 |
| 4,405,298 | 9/1983 | Blain | 425/308 |
| 4,776,269 | 10/1988 | Coggins et al. | 100/168 |
| 4,966,541 | 10/1990 | Mistretta | 425/249 |

FOREIGN PATENT DOCUMENTS 0002117 of 1915 United Kingdom ............. 100/168

Primary Examiner—Willard Hoag
Attorney, Agent, or Firm—Richard J. Smith

[57] ABSTRACT

A sheeter machine for processing dough into food products. A pair of rollers are mounted on offset shafts. A cutter mold is supported on pivotal arms. A wedge adjustment apparatus is provided for adjusting the position of the back roller relative to the front roller. A pivotal discharge arm is provided having a spring loaded tensioning assembly. First and second stripper wires are associated with the front roller to allow the cut and molded dough to be stripped from the front roller as it is moving downward toward the discharge arm. Collar assemblies are provided on the ends of the respective roller shafts. A release handle assembly is provided for moving the rear roller away from the front roller. The hopper saddle and the rollers are adapted for mating engagement.

18 Claims, 12 Drawing Sheets

SHEETER MACHINE

FIELD OF THE INVENTION

The present invention relates to food processing machinery. In particular, the present invention relates to a sheeter machine for processing dough into food products, such as tortillas and chips.

BACKGROUND OF THE INVENTION

Sheeter machines or sheeter heads are utilized in food processing for converting a supply of prepared dough into tortillas, chips and the like. For example, tortillas and various chips are made from corn flour referred to as "masa".

Sheeter machines typically comprise a pair of rollers through which the prepared dough is formed into a continuous sheet. The sheeting rollers or heads used in the processing of masa and like doughs employ stripper wires that separate the formed sheet from the rollers, as may be required. The typical sheeting head is comprised of back and front rollers disposed on horizontally spaced parallel axes. The formed sheet of dough is stripped from the back roller, transferred to the front roller, and cut into the desired shape by a cutter roller. The cut dough is stripped from the front roller to a conveyor or other apparatus for forward transport and further processing. The stripping wires typically comprise a first wire for stripping the dough from the back roller and a second wire for wire for stripping the dough from the back roller and a second wire for stripping the dough from the front roller onto a conveyor or other apparatus for transporting the formed tortillas or chips for further processing.

The design of a typical sheeter head makes it difficult to access the cutting mold for changes thereof. In addition, a typical sheeting head has the second wire for removing dough from the forward roller positioned at approximately 4 o'clock or 5 o'clock relative to the roller. That is, the stripper wire is on the side of the forward roller shaft opposite to the rear roller. Such a position has the inherent disadvantage of removing the cut dough from the roller as it is traveling upward, thereby causing the dough to fall awkwardly onto the removal conveyor or belt. Further, typical sheeter heads provide an adjustment for the back or rearward head or roller comprising a threaded rod through a block which has been drilled and tapped. However, this has the inherent disadvantage of the threads being stripped due to the pressure on the threads. Accordingly, the art has sought a sheeting machine which overcomes the foregoing limitations.

SUMMARY OF THE INVENTION

The present invention provides a sheeter machine which overcomes the limitations of the prior art. The sheeter machine of the present invention comprises front and back rollers, the center lines of which are substantially parallel but which lie in substantially parallel horizontal planes such that the front roller is offset below the rear roller. This arrangement allows for the cutter mold to be received from the hopper end of the machine. The cutter mold is received within arms which are pivotally connected to a pneumatic rotary actuator which facilities quick and easy changing of the cutter mold roller.

The present invention further comprises wedge apparatus for adjusting the position of the back or rear roller and variably positioning the rear roller relative to the front roller for accurate adjustment thereof. A quick release handle is also provided for the back roller for moving the back roller away from the front roller. The sheeter machine of the present invention is further provided with a rear stripper wire assembly for the back roller and first and second stripper wire assemblies for the front roller. The first and second stripper wires associated with the front roller are on the side of the front roller shaft adjacent to the rear roller. The front roller stripper wires slip between connecting bands and the front roller and are tightened by means of reverse pull air cylinders.

The sheeter machine of the present invention is further provided with a discharge arm with a pneumatic rotary actuator for raising and lowering the discharge arm, thereby permitting appropriate adjustment of the discharge arm relative to the oven belt. A spring loaded belt tensioning assembly is also provided for tensioning the belt away from the discharge end thereof.

The sheeter machine of the present invention is further provided with collar assemblies on each of the roller shafts for locking the collars in the desired position, thereby prohibiting the rollers from sliding sideways. The collar assemblies are positioned between the end of the respective shaft and respective bearing. A pin is pressed into the end of each shaft and the collar assembly is positioned between and presses against the pin and the bearing.

During operation, the rollers are driven by a drive motor which is operatively engaged with the front roller by a chain and sprocket assembly. The front roller drives the rear roller through a spur gear and also drives the cutter roller. The discharge arm is also driven by the front roller through a sprocket assembly. Masa or dough is fed into a hopper and passes through a saddle which is in sealing engagement with the rollers by means of a mating shoulder and lip. The masa or dough thereafter passes through the rollers, is stripped from the rear roller so as to adhere to the front roller, and is thereafter cut by the cutter mold and stripped from the front roller onto the discharge arm. The position of the first and second stripper wires associated with the front roller allows the molded dough to be stripped from the front roller as it is moving downward toward the discharge arm rather than during its upward movement away from the discharge arm.

DETAILED DESCRIPTION OF THE PREFERRED EMBODIMENT

Figure 1:
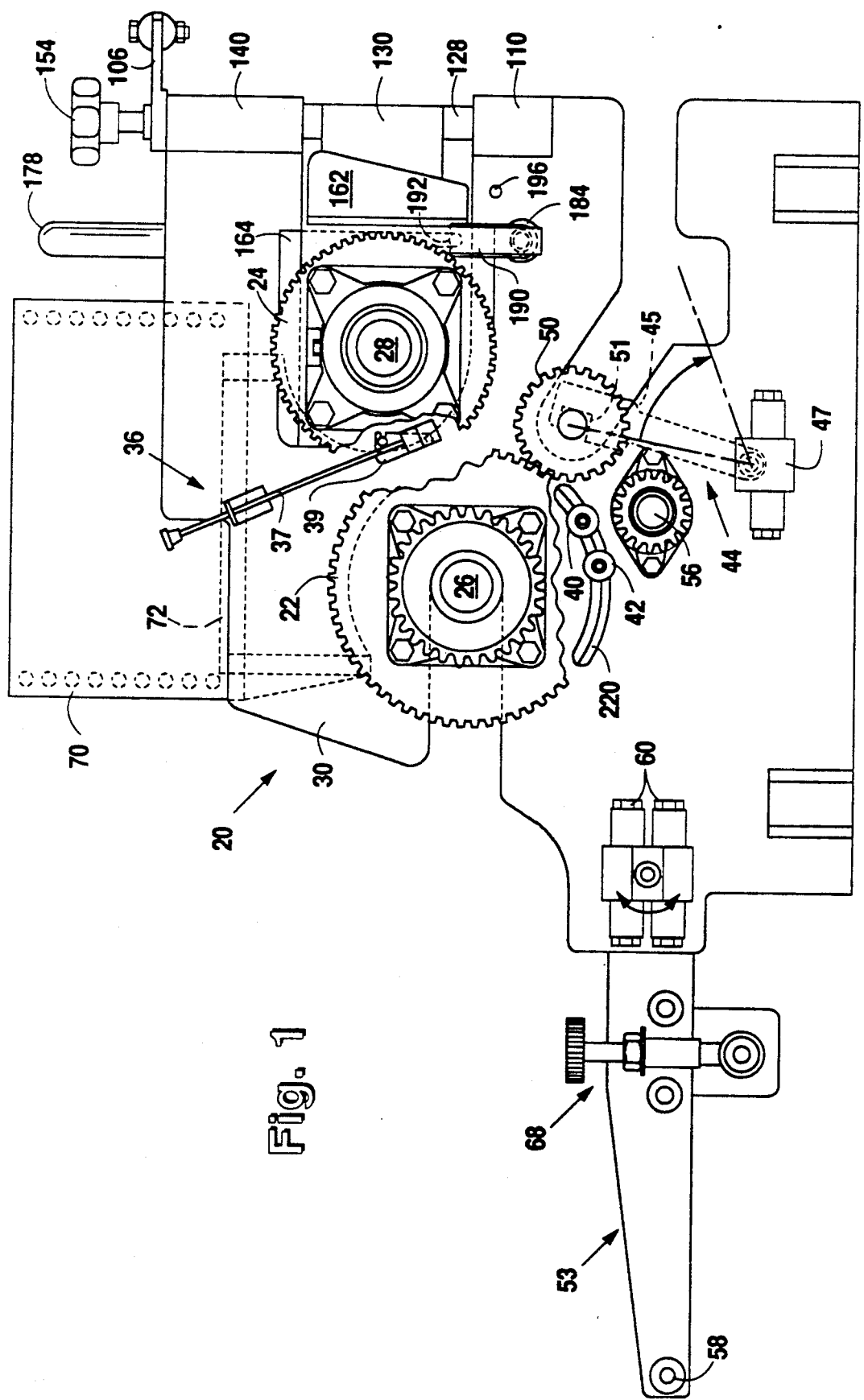
FIG. 1 is a left side view of the preferred embodiment of the sheeter machine of the present invention.

Referring to FIGS. 1-5, the sheeting machine of the present invention is identified by the number 20. The sheeting machine 20 comprises a front or forward roller 22 and a back or rear roller 24. Rollers 22 and 24 have shafts 26 and 28, respectively, welded thereto and extend between side plates 30 and 32. The rollers 22 and 24 and their respective shafts are journalled in bearings mounted in bearing plates. The axes of shafts 26 and 28 are substantially parallel but the axis of shaft 26 is below the axis of shaft 28. That is, axis 26 lies in a substantially horizontal plane which is substantially parallel to a substantially horizontal plane within which the axis of shaft 28 lies. Rollers 22 and 24 rotate in the directions illustrated by the arrows in FIG. 2.

Figure 2:
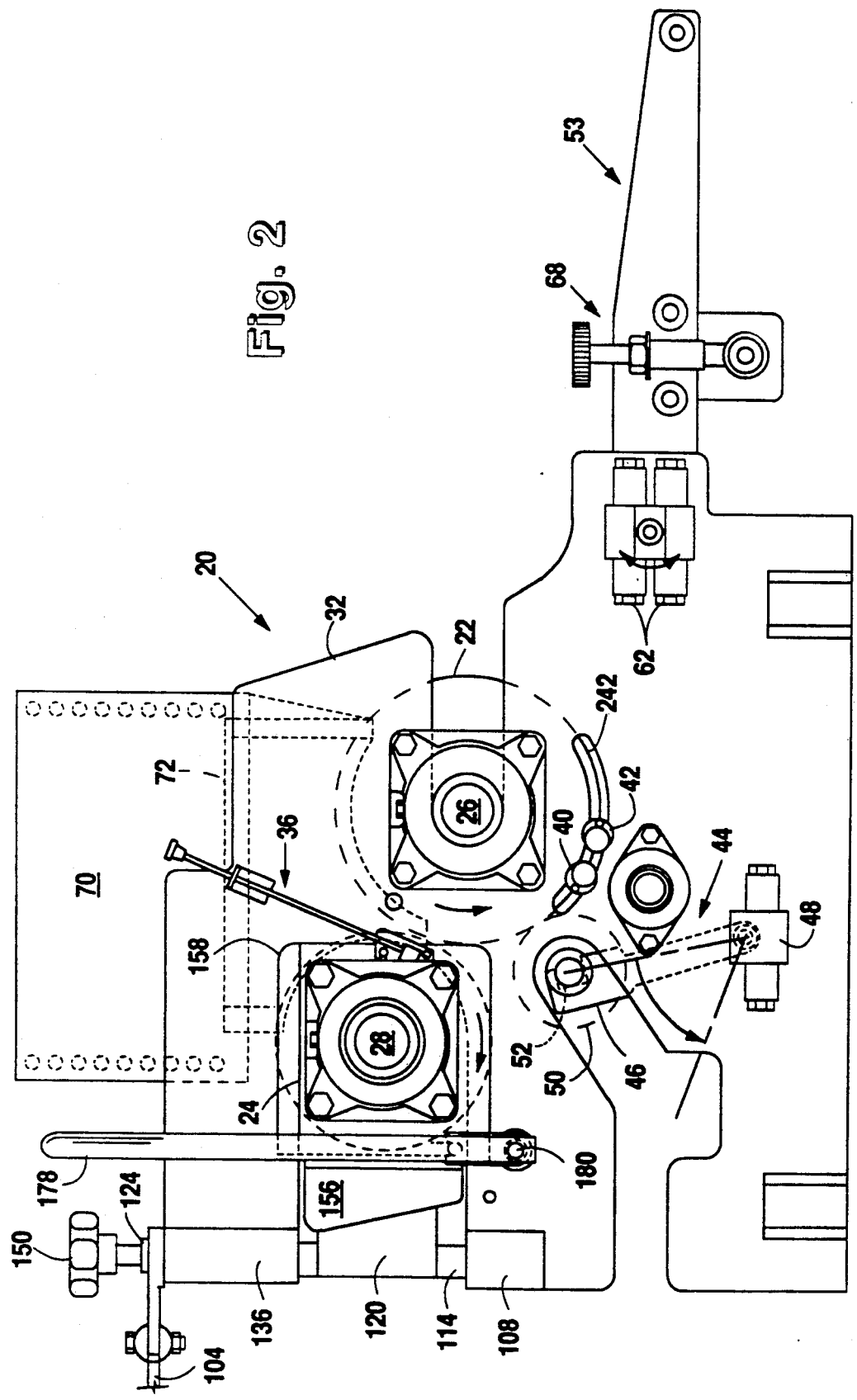
FIG. 2 is a right side view of the preferred embodiment of the sheeter machine of the present invention.
Figure 3:
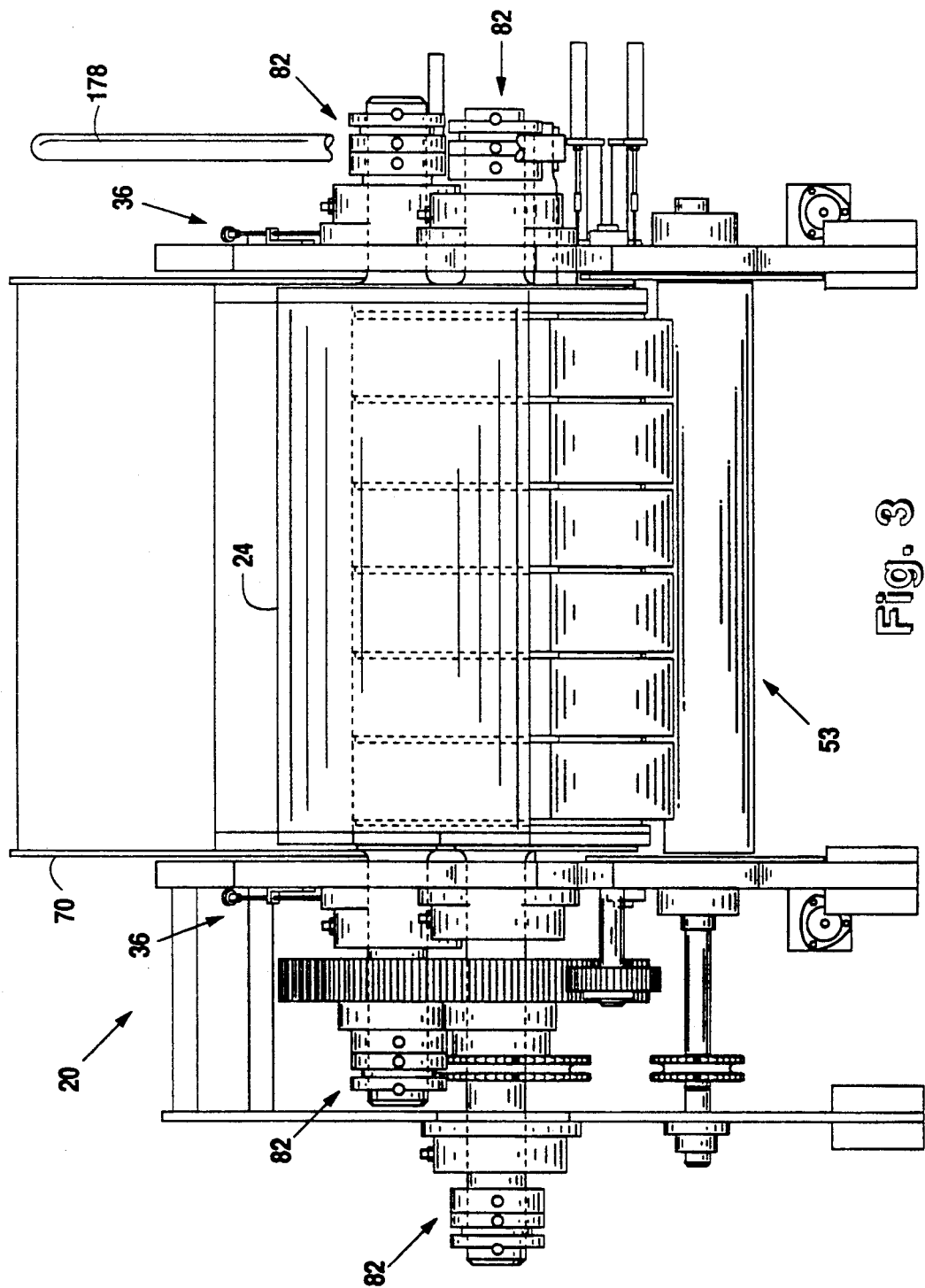
FIG. 3 is an end view of the preferred embodiment of the sheeter machine of the present invention from the hopper end.
Figure 4:
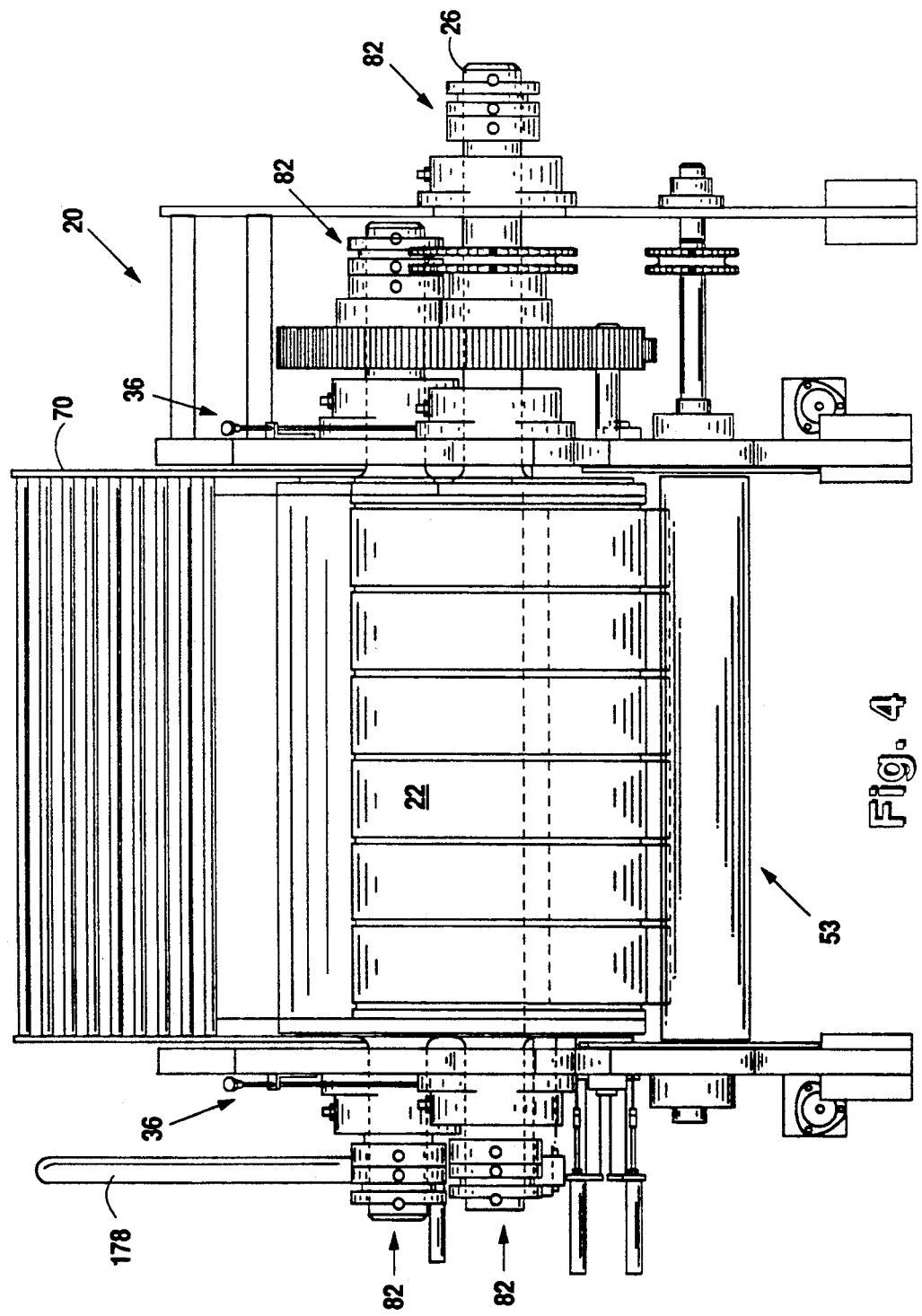
FIG. 4 is an end view of the preferred embodiment of the sheeter machine of the present invention from the discharge end.
Figure 5:
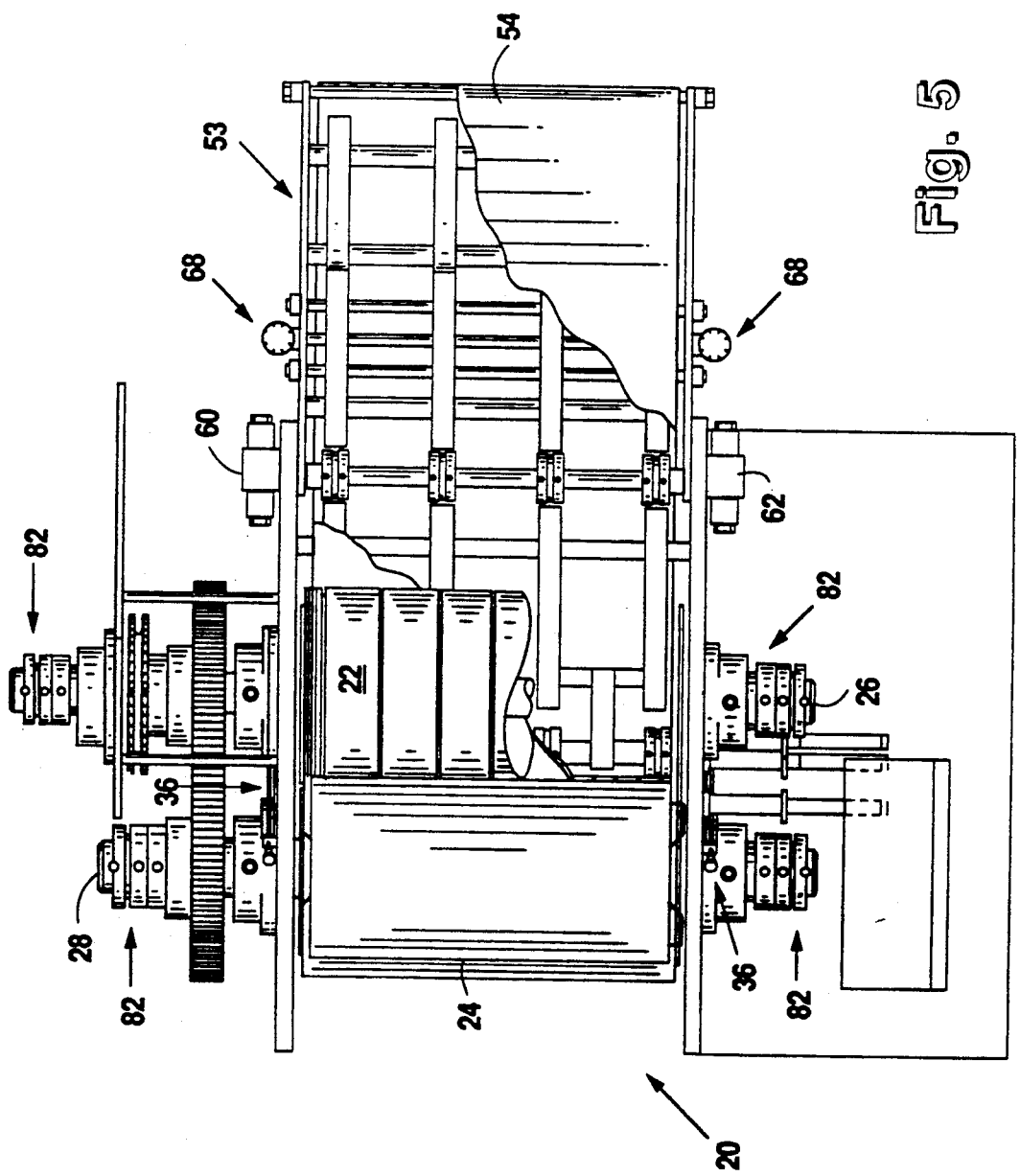
FIG. 5 is a top, cut away view of the preferred embodiment of the sheeter machine of the present invention.

Referring again to FIGS. 1-5, sheeting machine 20 further comprises a rear stripper wire assembly 36 for stripping masa or dough from the rear roller 24 and facilitating its adherence to the front roller 22. The rear stripper wire assembly 36 is substantially as shown in U.S. Pat. No. 4,966,541, the disclosure of which is hereby incorporated herein by reference. However, as described in detail below, an air cylinder may be utilized for tensioning the rear stripper wire. The machine 20 is further provided with a pair of stripper wire assemblies 40 and 42 associated with the front roller 22. Wires 40 and 42 are positioned at approximately the 7:00 o'clock position relative to roller 22, as illustrated in FIG. 2, and at approximately the 5:00 o'clock position relative to roller 22, as illustrated in FIG. 1. That is, wire assemblies 40 and 42 and their respective wires are on the side of shaft 26 adjacent to rear roller 24.

Referring again to FIGS. 1-4, the machine 20 further comprises a cutter mold assembly 44 comprising cradle arms 45 and 46 pivotally connected to pneumatic rotary actuators 47 and 48, respectively. Actuators 47 and 48 are bolted to side plates 30 and 32, respectively, and activated by a single control switch. Arms 45 and 46 are adapted to support a cutter mold or roller 50 by means of slots 51 and 52, respectively, which receive the shaft of roller 50. When it is desired to change or remove the cutter mold 50 and replace it with an alternate cutter mold, the cutter mold arms are pivoted downward in the manner shown by the arrows in FIG. 1 and FIG. 2, the cutter mold 50 is removed from the arms 45 and 46 from the hopper end of machine 20, a replacement cutter mold is inserted into arms 45 and 46 from the hopper end of machine 20, and the arms 45 and 46 are pivoted back upward towards the front roller 22, as illustrated in FIG. 1 and FIG. 2.

Referring again to FIGS. 1-5, the sheeting machine 20 further comprises a discharge arm 53. An endless loop discharge belt or conveyor 54 is mounted about rollers or pulleys 56 and 58. A pair of pneumatic rotary actuators 60 are bolted to side plate 30 and keyed to discharge arm 53. Likewise, a pair of pneumatic rotary actuators 62 are bolted to side plate 32 and keyed to arm 53. Upon activation of actuators 60 and 62, arm 53 pivots, as illustrated by the arrows in FIG. 1 and FIG. 2. The discharge arm 53 is further provided with a tensioning assembly 68 for tensioning belt 54, as described in greater detail hereinbelow. Tensioning assembly 68 is positioned adjacent to actuators 60 and 62 and away from shaft 58 so as to facilitate or permit tensioning of belt 54 away from an oven or other processing apparatus.

Figure 9:
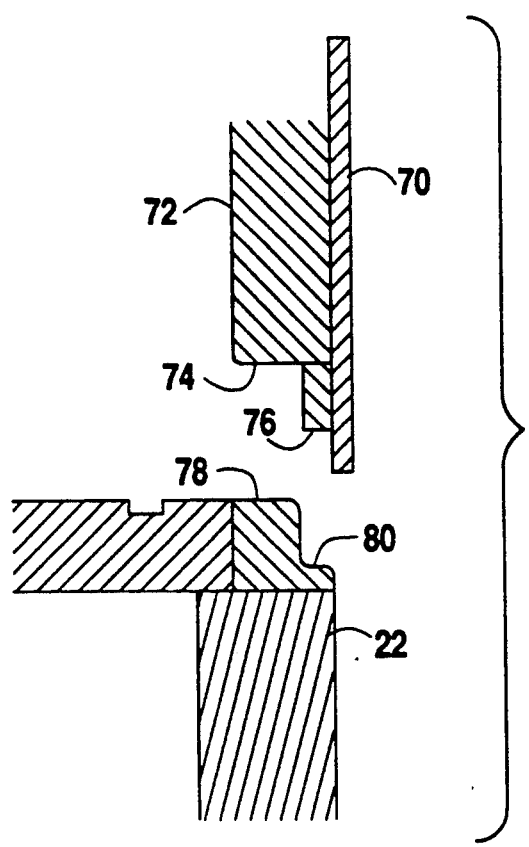
FIG. 9 is a cross-sectional view illustrating the mating engagement of the saddle and rollers.

Referring again to FIGS. 1-5, the sheeting machine 20 further comprises a hopper 70 for receiving the masa or dough to be extruded between the rollers 22 and 24. A saddle 72 is received within the hopper 70 for prohibiting masa or dough from passing out of the hopper 70 from the bottom of the hopper sides. As illustrated in FIG. 9, the saddle 72 is provided with a shoulder 74 and lip 76 for mating engagement with roller edge 78 and roller shoulder 80, respectively, on each of the rollers 22 and 24 (roller 22 being shown in FIG. 9). The mating engagement of saddle 72 with rollers 22 and 24 prohibits masa or dough from being urged outward from the hopper 70 through the sides thereof.

Referring again to FIGS. 1-5, the sheeting machine 20 may be supported by a cart or other housing having rollers (not shown). A drive motor (not shown) may be positioned within the housing or cart. The drive motor is operatively engaged with the front roller 22. The front roller 22 drives the rear roller 24 through a spur gear and drives the cutter roller or mold 50 through appropriate gears or sprockets. The discharge belt 54 is also operatively engaged with the front roller 22 through sprockets and is driven by the front roller 22. During operation of the machine 20, masa or dough is fed through the hopper and passes through the front roller 22 and rear roller 24. The rear stripper wire assembly 36 strips the masa or dough from the rear roller 24 so that it adheres to the front roller 22. Cutter roller 50 thereafter acts against the front roller to cut the masa or dough in the desired shapes and the cut and shaped masa or dough is thereafter stripped or separated from the front roller 22 by stripper wires associated with assemblies 40 and 42. First wire assembly 40 begins the stripping of the cut and shaped masa or dough and the second wire assembly 42 completes the stripping of the cut and shaped masa or dough. Further, the positions of assemblies 40 and 42, and their respective wires, toward rear roller 24 causes the cut and shaped masa or dough to be stripped as it is moving on roller 22 toward arm 53.

The shaped and cut masa falls onto the discharge belt 54 and is transported thereon to an oven or other processing apparatus (not shown).

Figure 10:
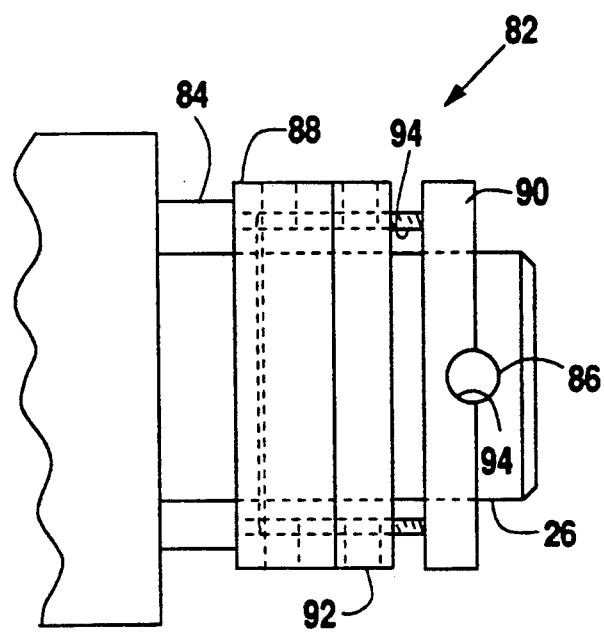
FIG. 10 is a side view of a roller shaft end illustrating the collar assembly.

Referring to FIG. 10, a collar assembly 82 is provided for each end of shafts 26 and 28 (shaft 26 being shown in FIG. 10) for locking the rollers 22 and 24 in position so as to prohibit the rollers 22 and 24 from sliding side to side. Each collar assembly 82 is positioned between the shaft bearing 84 and a one half inch (½") pin 86 which is pressed into a passage in the end of each respective shaft. A locking collar or spacer 88 is threaded onto the external threads of a sleeve 90 and presses against the bearing 84. A jamb nut 92 is also threaded onto sleeve 90 against locking collar 88. The pin 86 is received within the dimple 94 in sleeve 90. As such, the ends of each roller shaft extend through a passage 94 in sleeve 90.

Figure 8:
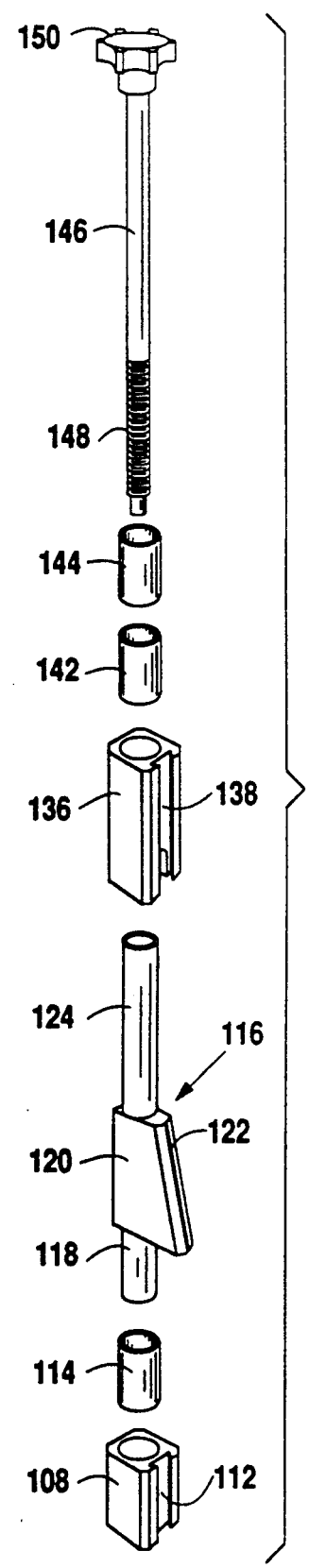
FIG. 8 is an exploded view of a portion of the wedge adjustment assembly in the sheeter machine of the present invention.
Figure 11:
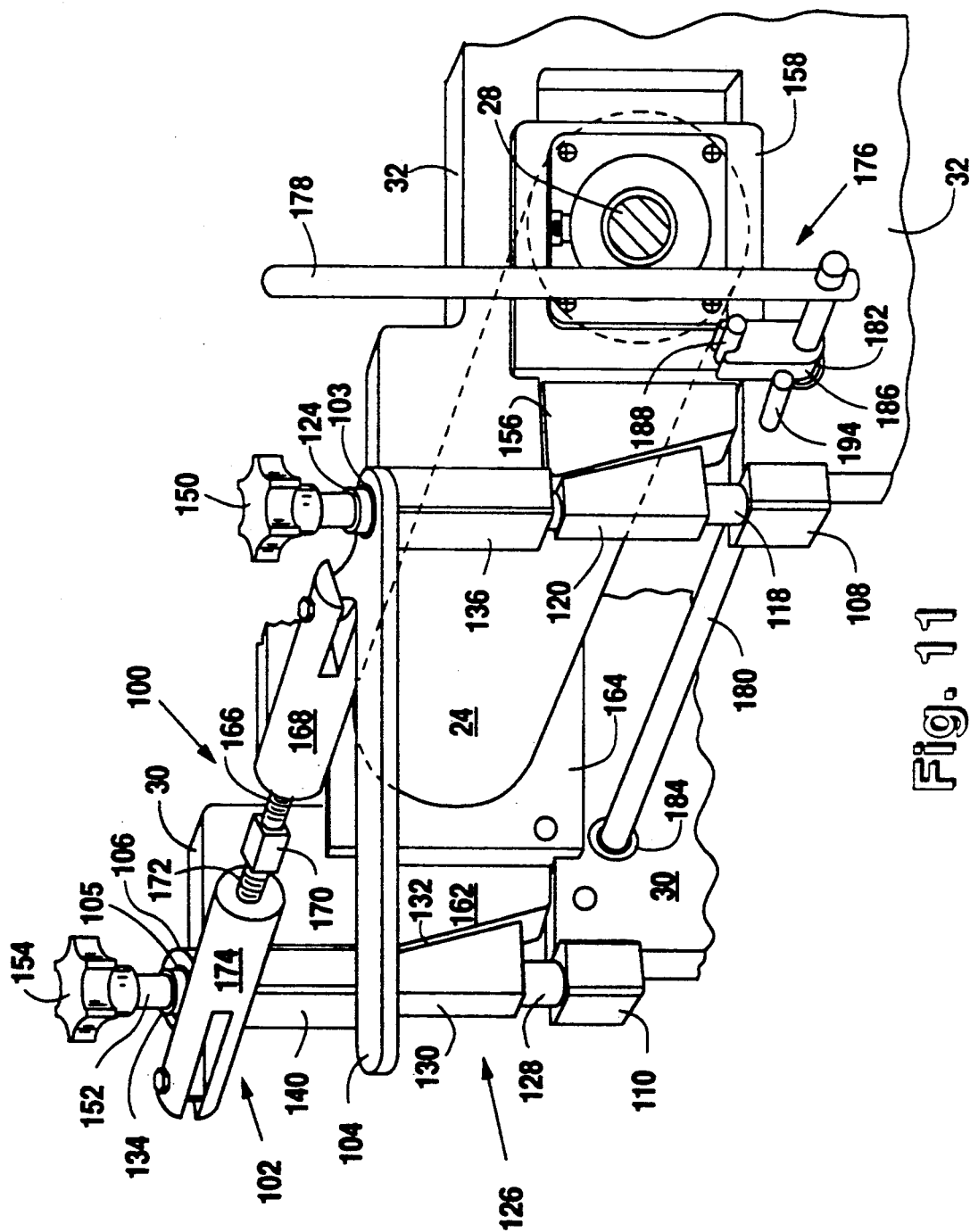
FIG. 11 is a perspective view of the wedge adjustment assembly in the sheeter machine of the present invention.

Referring to FIGS. 8 and 11, the sheeting machine 20 is further provided with a wedge adjustment assembly 100 for adjusting the position of the back roller 24 relative to front roller 22. The wedge adjustment assembly 100 comprises a linkage arm 102 which is operatively engaged with a handle 104 and an extension 106. A collar 103 is welded to handle 104 and a collar 105 is welded to extension 106. Wedge adjustment assembly 100 further comprises a first lower support or seat 108 and a substantially identical lower seat 110. Seat 108 has a dovetail groove 112 therein for locking in mating engagement with side plate 32. Seat 110 has a similar dovetail groove for locking in mating engagement with side plate 30. A first lower bushing 114 is received with seat 108. A similar lower bushing (not shown) is received within lower support 110. A first wedge member 116 is provided having a lower wedge tube 118, a wedge 120 having an angled, convex edge 122, and an upper wedge tube 124. Tube 118 is received within bushing 114. A second wedge member 126 is also provided having a lower wedge tube 128, a wedge 130 having an angled, convex edge 132, and an upper wedge tube 134. Tube 128 is received within the bushing within support 110. A first upper support 136 has a dovetail groove 138 therein whereby it is in mating engagement with side plate 32. A second upper support 140 is similar to upper support 136 and has a dovetail groove for mating engagement with side plate 30 in a similar manner. A pair of bushings 142 and 144 extend into the passage within upper support 136. A similar pair of bushings (not shown) are received within the respective passage within upper support 140. A first slide screw 146 having external threads 148 and a knob 150 extends through bushings 144, 142 and into the passage within wedge member 116 so as to be threadably engaged with the threads within wedge member 116. Likewise, a second slide screw 152 has a knob 154 on one end thereof and threads (not shown) on the opposite end thereof in threaded engagement with threads within wedge member 126, with slide screw 152 extending through the bushings within upper support 140 and into the passage within wedge member 126.

Referring again to FIG. 11, the convex edge 122 of wedge 120 is in releasable mating engagement with a complementary concave groove within a wedge plate 156 which is welded or otherwise connected to movable bearing plate 158. Likewise, the convex edge 132 of wedge 130 is in releasable mating engagement with a complementary concave groove within a wedge plate 162 which is welded or otherwise appropriately connected to movable bearing plate 164. The respective bearings for shaft 28 are appropriately mounted within plates 158 and 164. When it is desired to move roller 24 further toward roller 22, knobs 150 and 154 are rotated so that wedges 120 and 130, respectively, are urged or moved upward so as to thereby urge bearing plates 158 and 164, respectively, toward roller 22. Likewise, when it is desired to move roller 24 further away from roller 22, knobs 150 and 154 are rotated so that wedges 120 and 130 move downward. That is, wedges 120 and 130 may be variably positioned upward by rotation of knobs 150 and 154, respectively.

Referring again to FIG. 11, collar 103 is keyed to upper wedge tube 124. Likewise, collar 105 is keyed to upper wedge tube 134. Pulling on handle 104 causes wedges 120 and 130 to rotate approximately ninety degrees and thereby disengage from wedge plates 156 and 162, respectively. Turning handle 104 in the opposite direction causes wedges 120 and 130 to reengage with plates 156 and 162, respectively. As further illustrated in FIG. 11, arm 102 is provided with a turnbuckle assembly, comprising a first externally threaded link 166 which is threadedly engaged with first arm member 168 and an adjustment knob 170. A second externally threaded link 172 is threadedly engaged with a second arm member 174 and adjustment knob 170. Appropriate rotation of adjustment knob 170 adjusts and varies the distance between the respective wedges 120 and 130 for proper alignment with the respective bearing plates.

Referring again to FIG. 11, a quick release assembly 176 is provided for the rear roller 24. A handle 178 is connected to a shaft 180 which is journalled in bearings 182 and 184 within side plates 32 and 30, respectively. A first forked extension arm 186 has an upper groove within which it engages a pin 188 connected to bearing plate 158. As illustrated in FIG. 1, a second forked extension arm 190 has an upper groove within which it receives a pin 192 which is connected to bearing plate 164. When it is desired to back roller 24 away from roller 22, wedges 120 and 130 are disengaged from wedge plates 156 and 162, respectively, as described hereinabove, and handle 178 is pivoted downward until arms 186 and 190 strike stop pins 194 and 196, respectively, which are connected to side plates 32 and 30, respectively. Rear roller 24 may be moved back into close proximity with front roller 22 by pivoting handle 178 back into the position shown in FIG. 11 and turning handle 104 until wedges 120 and 130 are reengaged with wedge plates 156 and 162, respectively.

Figure 6:
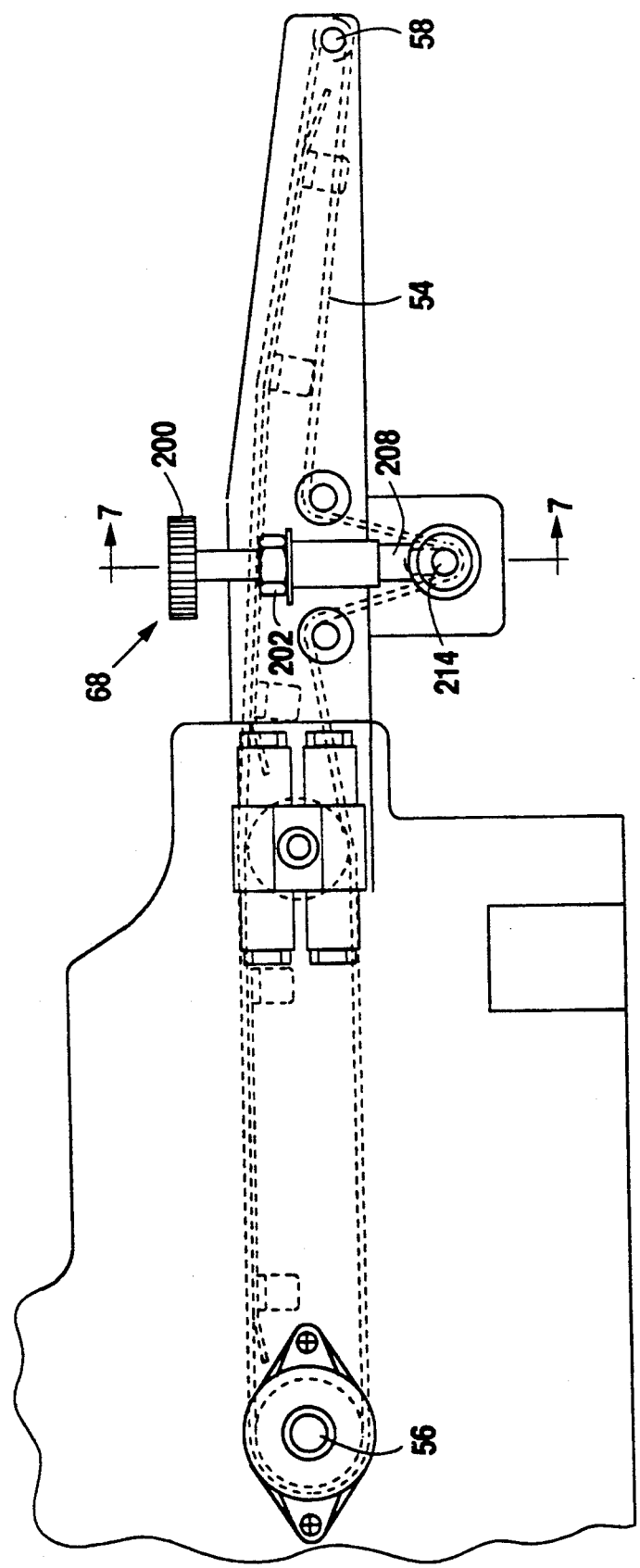
FIG. 6 is a side view of the discharge arm in the preferred embodiment of the sheeter machine of the present invention.
Figure 7:
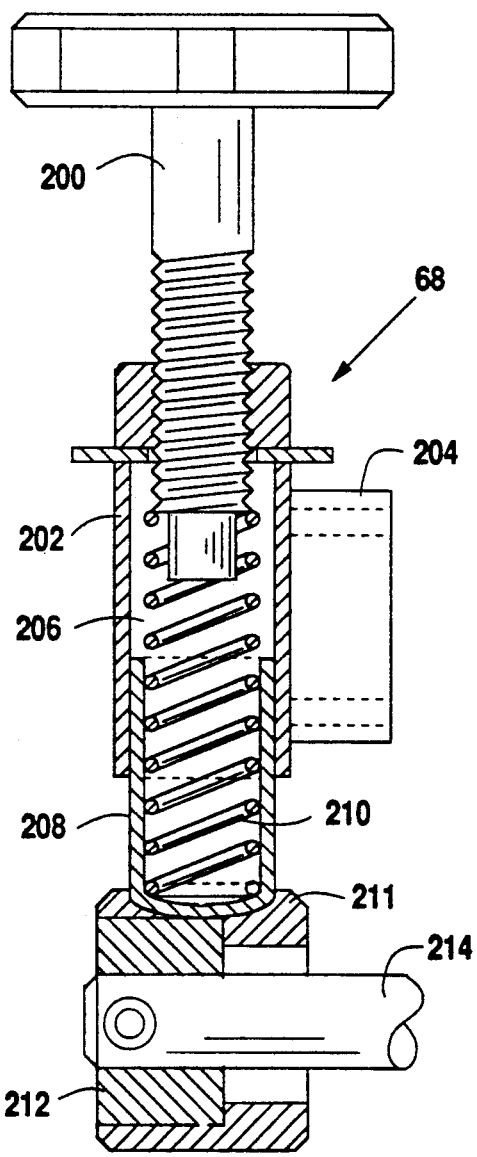
FIG. 7 is a cross sectional view taken along section lines 7—7 of FIG. 6 illustrating the spring loaded tensioner assembly associated with the discharge arm.

Referring to FIG. 6 and FIG. 7, the discharge arm tensioner assembly 68 will be described in greater detail. Assembly 68 comprises an externally threaded knob 200 which is threaded into a housing 202. Housing 202 has an extension arm 204 which is connected to the side of discharge arm 53. Housing 202 has a cavity 206 therein within which is received the lowermost end of knob 200, the uppermost end of a piston or plunger member 208, and a spring 210 which is biased against the lowermost end of knob 200 and the inside of plunger 208. The lowermost end of plunger 208 is welded to housing 211 having a bearing or bushing 212 therein within which belt tension shaft 214 rotates. Rotation of knob 200 in one direction increases the downward pressure against spring 210 and, accordingly, shaft 214. Rotation of knob 200 in the opposite direction will correspondingly reduce the downward pressure against spring 210 and, accordingly, shaft 214. Further, as the belt 54 expands, the spring loaded tensioning assembly 68 provides an automatic take-up or adjustment for shaft 214.

Referring to FIGS. 12-15, front roller wire assemblies 40 and 42 will be described in greater detail. One side of wire assembly 40 comprises a wire support 218 which extends into an angular curved slot 220 and is connected to a back plate 222 by a screw 224 which extends though a central passage in wire support 218 into threaded engagement with back plate 222. A wire 226 extends through a hole in wire support 218 and is connected thereto at 228. Likewise, wire tension assembly 42 comprises a wire support 230 similar to wire support 218, a back plate 232 similar to plate 222 and a screw 234 which connects wire support 230 to back plate 232 in the same manner as described in connection with wire assembly 40. A wire 236 is connected to wire support 230 at 238. Back plates 222 and 232 extend into slot 220. When screws 224 and 234 are tightened, the respective support plates 218, 230 and back plates 222, 232 abut firmly against side plate 30.

Figure 12:
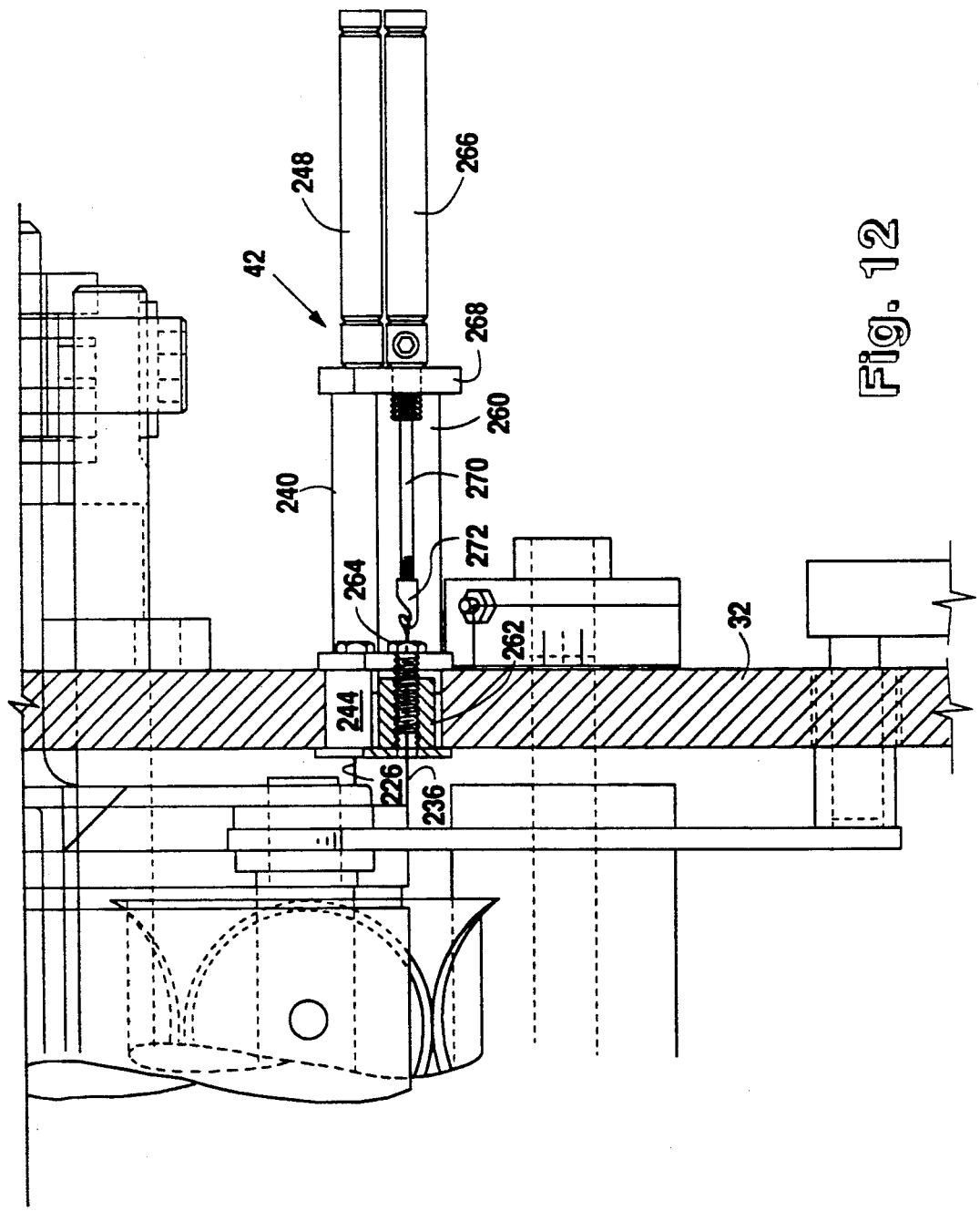
FIG. 12 is a partial cross-sectional view illustrating the air cylinder wire tensioner assembly in the sheeter machine of the present invention.
Figure 13:
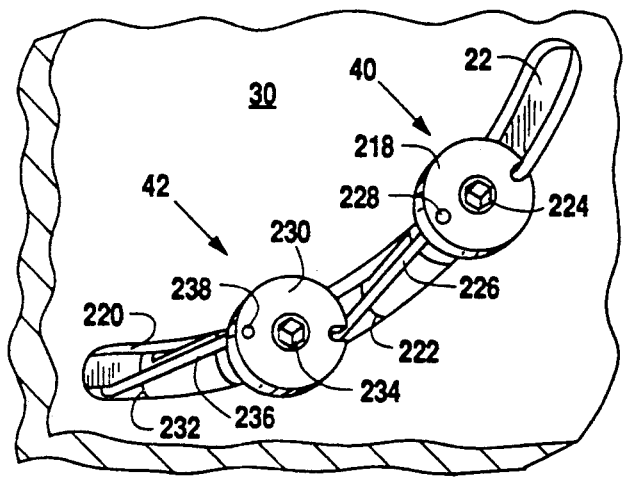
FIG. 13 is a partial perspective view of a wire assembly in the sheeter machine of the present invention.
Figure 14:
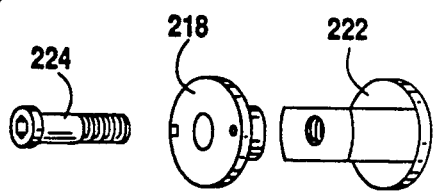
FIG. 14 is an exploded view of a portion of the wire assembly in the sheeter machine of the present invention.
Figure 15:
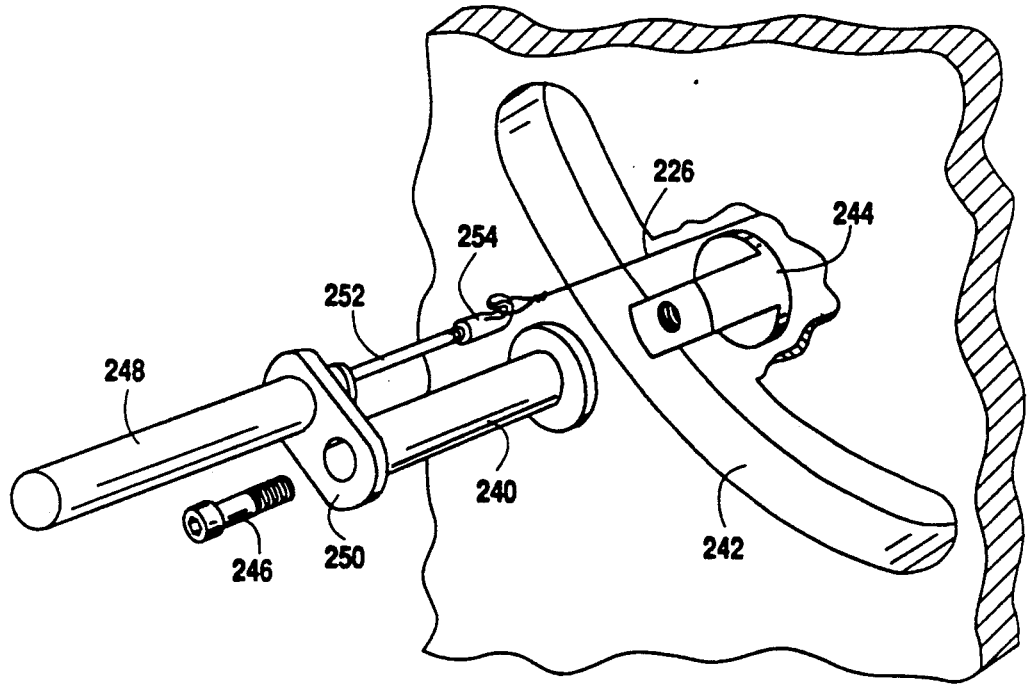
FIG. 15 is a perspective view of a wire tensioner assembly in the sheeter machine of the present invention.

Referring to FIG. 12 and FIG. 15, the air cylinder tensioner assembly associated with the wire positioner assemblies 40 and 42 will be described in greater detail, with FIG. 15 illustrating one of the air cylinder assemblies. Wire assembly 40 comprises a cylinder mounting bracket 240. Cylinder mounting bracket 240 is connected to a back plate 244 by a screw 246 which extends through a passage in mounting bracket 240 into back plate 244. Back plate 244 extends into curved angular slot 242. A reverse pull air cylinder 248 is mounted to the flange 250 of bracket 240. Cylinder 248 has an arm 252 which is connected to wire 226 by means of a hook on the end of arm 252. Likewise, wire assembly 42 comprises an air cylinder mounting bracket 260 which is connected to a back plate 262 by a screw 264 which extends through bracket 260 into back plate 262. Back plate 262 extends into curved angular slot 242. A reverse pull air cylinder 266 is connected to the flange 268 of mounting bracket 260. Cylinder 266 has an arm 270 which is connected on the opposite end thereof to wire 236 by a hook 272. Wires 226 and 236 are loosened or tightened by activation of cylinders 248 and 266, respectively. When screws 246 and 264 are tightened, the respective mounting brackets 240, 260 and back plates 244, 262 abut firmly against side plate 32.

It is to be understood that the position of wire 226 along the circumference of roller 22 may be adjusted clockwise or counter clockwise along grooves 220 and 242 by loosening screw 224 and screw 246, sliding back plates 222 and 244 along grooves 220 and 242, respectively, and retightening screws 224 and 246 when the wire 226 is at the desired position. Likewise, the position of wire 236 can be adjusted clockwise or counter clockwise relative to the circumference of roller 22 by loosening screws 234 and 264, sliding back plates 232 and 262 along slots 220 and 242, respectively, and retightening screws 234 and 264 when wire 236 is at the desired position. Accordingly, the sheeter machine 20 of the present invention permits variable positioning of each end of the front roller wires 226 and 236 relative to and about the circumference of front roller 22.

Figure 16:
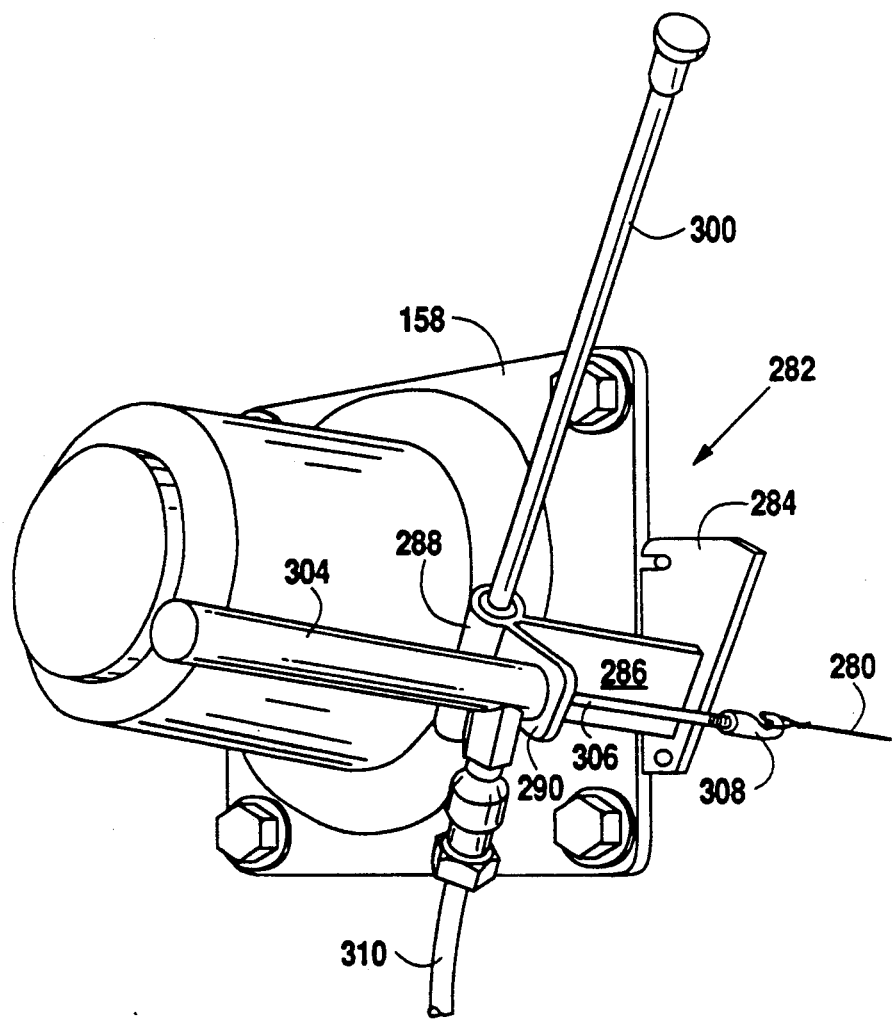
FIG. 16 is a perspective view of the rear roller wire tensioner assembly.
Figure 17:
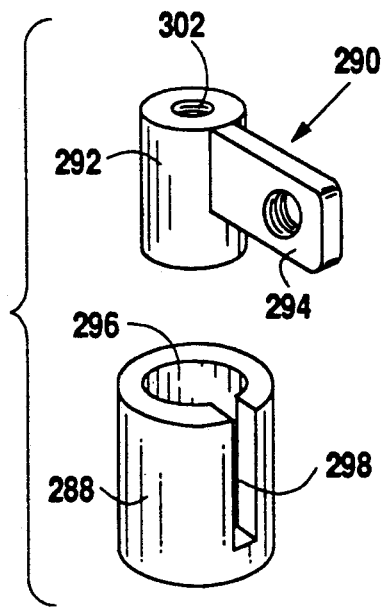
FIG. 17 is an exploded view of a sleeve tube and cylinder mounting bracket associated with the rear roller wire tensioner.

Referring to FIGS. 16-17, the rear roller wire tensioning assembly 36 will be described in greater detail. A rear roller stripper wire 280 is connected on one side of roller 24 in the manner as described in U.S. Pat. No. 4,966,541 whereby vertical adjustment of the stripper wire 280 is provided. As illustrated in FIG. 1, a rod 37 is in threaded engagement with a wire holder which is captive within the bracket 39 mounted to bearing plate 164. The opposite side of roller 24 is provided with a cylinder adjustment assembly 282. The cylinder adjustment assembly 282 comprises a mounting bracket 284 which is bolted to bearing plate 158. An extension plate 286 is welded or otherwise connected to bracket 284 and a sleeve tube 288. A cylinder mounting bracket 290 having a cylindrical body portion 292 and a flange portion 294 is slidably engaged with sleeve tube 288. Sleeve tube 288 has a passage 296 therein and a longitudinal slot 298. Sleeve 292 is received within passage 296 in sliding engagement with flange 294 extending outward through slot 298. An adjustment rod 300 extends into sleeve tube 288 in threaded engagement with internal threads 302 within sleeve 292. As rod 300 is rotated, cylinder mounting bracket 290 moves longitudinally up and down the length of tube 288.

Referring again to FIG. 16, a reverse pull air cylinder 304 is connected to the flange 294 of bracket 290. Cylinder 304 has an arm 306 with a hook 308 on the opposite end thereof which is connected to wire 280. Air may be supplied to cylinder 304 by line 310. When it is desired to tension or loose wire 280, cylinder 304 is activated so as the push or pull arm 306 as may be desired.

It is to be understood that front roller 22 has a larger outer diameter than rear roller 24. Such a design allows for a reduced speed of the drive such that an equivalent horsepower motor will provide more torque to roller 22. For example, front roller 22 has an outer diameter of approximately twelve and one half inches (12½") whereas rear roller 24 has an outer diameter of approximately ten and one half inches (10½"). It is also to be understood that the wall of front roller 22 has a thickness of approximately one and one eighth inches (1⅛"), and that the wall of rear roller 24 has a thickness of approximately one inch (1"). It is also to be understood that pneumatic rotary actuators 46, 48, 60 and 62, may be a Pneu-Turn rotary actuator manufactured by Bimba Manufacturing Company.

While the sheeter machine has been described in connection with the preferred embodiment, it is not intended to limit the invention to the particular form set forth, but on the contrary, it is intended to cover such alternatives, modifications and equivalents as may be included within the spirit and scope of the invention as defined by the appended claims.

We claim:
1. A sheeter machine, comprising:
   first and second rollers, wherein said first and second rollers have first and second shafts, respectively, and said first and second shafts are substantially parallel and lie in substantially horizontal planes such that said shaft of said second roller is below said shaft of said first roller;
   means for separating dough from a back side of said second roller;
   a cutting member for acting against said back side of said second roller to cut said dough;
   means for pivotally supporting said cutting member;
   a discharge arm positioned beneath said second roller; and
   wherein said means for separating said dough from said second roller is positioned such that said cut dough is stripped from said second roller as said cut dough travels toward said discharge arm.
2. A sheeter machine, as recited in claim 1, further comprising a saddle received within a hopper for receiving said dough, said saddle being in mating engagement with said first and second rollers.

3. A sheeter machine, as recited in claim 2, wherein said saddle comprises a shoulder and lip for mating engagement with an edge and a shoulder of each of said rollers.

4. A sheeter machine, as recited in claim 1, wherein said discharge arm comprises an endless loop conveyor belt and a tensioning assembly for tensioning said conveyor belt.

5. A sheeter machine, as recited in claim 1, wherein said second roller has a larger outer diameter than said first roller.

6. A sheeter machine, as recited in claim 1, further comprising means for variably positioning said wire assembly relative to said second roller.

7. Apparatus for processing dough, comprising:
first and second rollers;
means for cutting said dough against said second roller;
means for separating said cut dough from said second roller;
means for receiving said cut dough from said second roller; and
a wedge adjustment assembly for adjusting the position of one of said rollers relative to said other roller, said wedge adjustment assembly comprising a pair of wedge assemblies, each of said wedge assemblies comprising a wedge member and a wedge plate adapted for releasable engagement; and
means for simultaneously disengaging said wedge members from said wedge plates.

8. Apparatus for processing dough, as recited in claim 7, wherein said means for simultaneously disengaging said wedge member from said wedge plate comprises means for rotating said wedge member.

9. Apparatus for processing dough, as recited in claim 8, wherein said means for rotating said wedge members comprises a linkage assembly connected to said wedge members and a handle connected to said linkage assembly, whereby rotation of said handle rotates each of said wedge members away from said respective wedge plates.

10. Apparatus for processing dough, as recited in claim 9, further comprising a handle release assembly for moving one of said rollers away from another one of said rollers when said wedge members are disengaged from said wedge plates.

11. Apparatus for processing dough, comprising:
a forward roller and a rearward roller, wherein said forward and rearward rollers have first and second shafts, respectively, and said first and second shafts are substantially parallel and lie in substantially horizontal planes such that said shaft of said forward roller is below said shaft of said rearward roller;
a cutting member for acting against a back side of said forward roller to cut said dough;
means for pivotally supporting said cutting member;
a wire assembly for separating said cut dough from said back side of said forward roller;
means for variably positioning said wire assembly relative to said forward roller;
an endless loop conveyor belt positioned beneath said forward roller for receiving said cut dough from said forward roller;
a saddle received within a hopper for receiving said dough, said saddle being in mating engagement with said first and second rollers; and
wherein said wire assembly is positioned such that said cut dough is stripped from said second roller as said cut dough travels toward said conveyor belt.

12. Apparatus for processing dough, comprising:
first and second rollers;
means for cutting said dough against said second roller;
a wire assembly for separating said cut dough from said second roller;
means for variably positioning said wire assembly relative to said second roller;
an endless loop conveyor belt for receiving said cut dough from said second roller;
a tensioning assembly for tensioning said conveyor belt; and
a wedge adjustment assembly for adjusting the position of one of said rollers relative to said other roller, said wedge adjustment assembly comprising a pair of wedge assemblies, each of said wedge assemblies comprising a wedge member and a wedge plate adapted for releasable engagement; and
means for simultaneously disengaging said wedge members from said wedge plates.

13. Apparatus for processing dough, comprising:
first and second rollers, wherein said first and second rollers have first and second shafts, respectively, and said first and second shafts are substantially parallel and lie in substantially horizontal planes such that said shaft of said second roller is below said shaft of said first roller;
a wedge adjustment assembly for adjusting the position of one of said rollers relative to said other roller, said wedge adjustment assembly comprising a pair of wedge assemblies, each of said wedge assemblies comprising a wedge member and a wedge plate adapted for releasable engagement;
means for simultaneously disengaging said wedge members from said wedge plates;
a cutting member for acting against said second roller to cut said dough;
means for pivotally supporting said cutting member;
a wire assembly for separating said cut dough from said second roller;
a discharge arm; and
wherein said wire assembly is positioned such that said cut dough is stripped from said second roller as said cut dough travels toward said discharge arm.

14. Apparatus for processing dough, comprising:
first and second rollers, wherein said first and second rollers have first and second shafts, respectively, and said first and second shafts are substantially parallel and lie in substantially horizontal planes such that said shaft of said second roller is below said shaft of said first roller;
a wedge adjustment assembly for adjusting the position of one of said rollers relative to said other roller, said wedge adjustment assembly comprising a pair of wedge assemblies, each of said wedge assemblies comprising a wedge member and a wedge plate adapted for releasable engagement;
means for simultaneously disengaging said wedge members from said wedge plates;
a cutting member for acting against said second roller to cut said dough;
means for pivotally supporting said cutting member;
a wire assembly for separating said cut dough from said second roller;

means for variably positioning said wire assembly relative to said second roller;

a discharge arm; and wherein said wire assembly is positioned such that said cut dough is stripped from said second roller as said cut dough travels toward said discharge arm.

15. Apparatus for processing dough, comprising:

first and second rollers, wherein said first and second rollers have first and second shafts, respectively, and said first and second shafts are substantially parallel and lie in substantially horizontal planes such that said shaft of said second roller is below said shaft of said first roller;

a wedge adjustment assembly for adjusting the position of one of said rollers relative to said other roller, said wedge adjustment assembly comprising a pair of wedge assemblies, each of said wedge assemblies comprising a wedge member and a wedge plate adapted for releasable engagement;

means for simultaneously disengaging said wedge members from said wedge plates;

a cutting member for acting against said second roller to cut said dough;

means for pivotally supporting said cutting member;

a wire assembly for separating said cut dough from said second roller; means for variably positioning said wire assembly relative to said second roller;

an endless loop conveyor belt for receiving said cut dough from said second roller;

a tensioning assembly for tensioning said conveyor belt; and wherein said wire assembly is positioned such that said cut dough is stripped from 16. A method for processing dough, comprising the steps of:

positioning first and second rollers, said first and second rollers having first and second shafts, respectively, such that said first and second shafts are substantially parallel and lie in substantially horizontal planes and such that said shaft of said second roller is below said shaft of said first roller;

positioning a cutting roller adjacent to a back side of said second roller;

positioning a stripper wire assembly adjacent to said back side of said second roller;

positioning a discharge arm beneath said second roller;

feeding said dough between said first and second rollers;

cutting said dough; and stripping said cut dough from said second roller as said cut dough travels towards said discharge arm.

17. A method for processing dough, as recited in claim 16 further comprising the step of adjusting the position of one of said rollers relative to said other roller, said wedge adjustment assembly comprising a pair of wedge assemblies, each of said wedge assemblies comprising a wedge member and a wedge plate adapted for releasable engagement.

18. A method for processing dough, as recited in claim 17, further comprising the step of simultaneously disengaging said wedge members from said wedge plates.

* * * * *